US010338944B2

United States Patent
Whitbourne et al.

(10) Patent No.: US 10,338,944 B2
(45) Date of Patent: Jul. 2, 2019

(54) AUTOMATIC DISCOVERY AND CLASSFICATION OF JAVA VIRTUAL MACHINES RUNNING ON A LOGICAL PARTITION OF A COMPUTER

(71) Applicant: INTERNATIONAL BUSINESS MACHINES CORPORATION, Armonk, NY (US)

(72) Inventors: Matthew D. Whitbourne, Winchester (GB); Nigel V. Williams, Agoura Hills, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

(21) Appl. No.: 15/067,821

(22) Filed: Mar. 11, 2016

(65) Prior Publication Data
US 2017/0262305 A1   Sep. 14, 2017

(51) Int. Cl.
*G06F 9/455* (2018.01)

(52) U.S. Cl.
CPC ...... *G06F 9/45533* (2013.01); *G06F 9/45504* (2013.01); *G06F 2009/45583* (2013.01)

(58) Field of Classification Search
None
See application file for complete search history.

(56) References Cited

U.S. PATENT DOCUMENTS

| 2008/0028385 | A1* | 1/2008 | Brown | G06F 8/65 717/170 |
| 2008/0310431 | A1* | 12/2008 | Nezamzadeh | G07F 19/20 370/401 |
| 2012/0084262 | A1* | 4/2012 | Dwarampudi | G06F 11/448 707/667 |
| 2015/0193243 | A1* | 7/2015 | Varkhedi | G06F 9/45533 718/1 |

* cited by examiner

*Primary Examiner* — Lewis A Bullock, Jr.
*Assistant Examiner* — Bruce S Ashley
(74) *Attorney, Agent, or Firm* — Cantor Colburn LLP; Teddi Maranzano

(57) ABSTRACT

Embodiments include methods, and computing systems, and computer program products for automatic discovery and classification of Java virtual machines running on a logical partition of a computing system. Aspects include: examining, via a service request block (SRB) routine, each of address spaces to identify one or more address spaces eligible to operate a Java virtual machine, retrieve, by a Java virtual machine management system via a CSVINFO macro call to each of address space control blocks on the logical partition of the computing system, in a predetermined interval, each of the of Java virtual machines corresponds to one of the address spaces, discovering, through CSVINFO retrieved, one or more Java virtual machines running on the logical partition of the computing system, and classifying, through Content Directory Entries examined using the CSVINFO macro, the one or more Java virtual machines discovered.

20 Claims, 4 Drawing Sheets

US 10,338,944 B2

AUTOMATIC DISCOVERY AND CLASSFICATION OF JAVA VIRTUAL MACHINES RUNNING ON A LOGICAL PARTITION OF A COMPUTER

BACKGROUND

The present disclosure relates generally to mainframe computing, and more particularly to methods and systems of automatic discovery of Java virtual machines running on a logical partition (LPAR) of a z/OS computer.

A Java virtual machine (JVM) interprets compiled Java binary code (called bytecode) for a computer's processor (or "hardware platform") so that it can perform a Java program's instructions. Java was designed to allow application programs to be built that could be run on any platform without having to be rewritten or recompiled by the programmer for each separate platform. More and more applications are running on JVMs, and managing these JVMs becomes more and more important to ensure the applications are running smoothly and efficiently on these JVMs. A Java virtual machine management system is designed to manage all aspects of JVMs running on a logical partition (LPAR) of a z/OS computer system. Management of the JVMs may include discovery of JVMs running on the computer system, and discovery of JVMs may include identifying jobs, started tasks or subsystems that are running JVMs without having to configure the JVMs, monitoring jobs or subsystems, identifying the subsystem type, such as customer information control system (CICS), information management system (IMS), or relational database management system DB2, the version of Java that is being used, and the file system directory location of the Java runtime (JAVA_HOME).

Most computers rely on a network connection for discovery and management of JVMs. When network bottlenecks occur, the management and discovery operations slows down. When the network is down, the management and discovery operations are disrupted.

Therefore, heretofore unaddressed needs still exist in the art to address the aforementioned deficiencies and inadequacies.

SUMMARY

In an embodiment of the present invention, a method for automatic discovery of Java virtual machines (JVM) running on a logical partition of a computing system may include: examining, via a service request block (SRB) routine, each of address spaces to identify one or more address spaces eligible to operate a JVM, retrieve, by a JVM management system via a CSVINFO macro call to each of address space control blocks (ASCB) on the logical partition (LPAR) of the computing system, in a predetermined interval, each of the of ASCBs corresponds to one of the address spaces, discovering, through CSVINFO retrieved, one or more JVMs running on the LPAR of the computing system, and classifying, through Content Directory Entries examined using the CSVINFO macro, the one or more JVMs discovered. The information discovered includes a path to an installation location and runtime programs, a version, a service release, fix pack levels, and signature load modules of the JVMs.

In another embodiment of the present invention, a computing system for automatic discovery of JVM running on a logical partition of a computing system may include a memory storing computer executable instructions for the computing system, and a processor for executing the computer executable instructions. When the computer executable instructions are executed at the processor, the computer executable instructions cause the computing system to perform: examining, via a SRB routine, each of address spaces to identify one or more address spaces eligible to operate a JVM, retrieve, by a JVM management system via a CSVINFO macro call to each of ASCB on the LPAR of the computing system, in a predetermined interval, each of the of ASCBs corresponds to one of the address spaces, discovering, through CSVINFO retrieved, one or more JVMs running on the LPAR of the computing system, and classifying, through Content Directory Entries examined using the CSVINFO macro, the one or more JVMs discovered.

In yet another embodiment of the present invention, a computer program product for automatic discovery of Java virtual machines running on a logical partition of a computing system may include a non-transitory computer readable storage medium having computer executable instructions embodied therewith, when executed by a processor on a computing system, the computer executable instructions cause the processor to perform: examining, via a SRB routine, each of address spaces to identify one or more address spaces eligible to operate a JVM, retrieve, by a JVM management system via a CSVINFO macro call to each of ASCB on the LPAR of the computing system, in a predetermined interval, each of the of ASCBs corresponds to one of the address spaces, discovering, through CSVINFO retrieved, one or more JVMs running on the LPAR of the computing system, and classifying, through Content Directory Entries examined using the CSVINFO macro, the one or more JVMs discovered.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
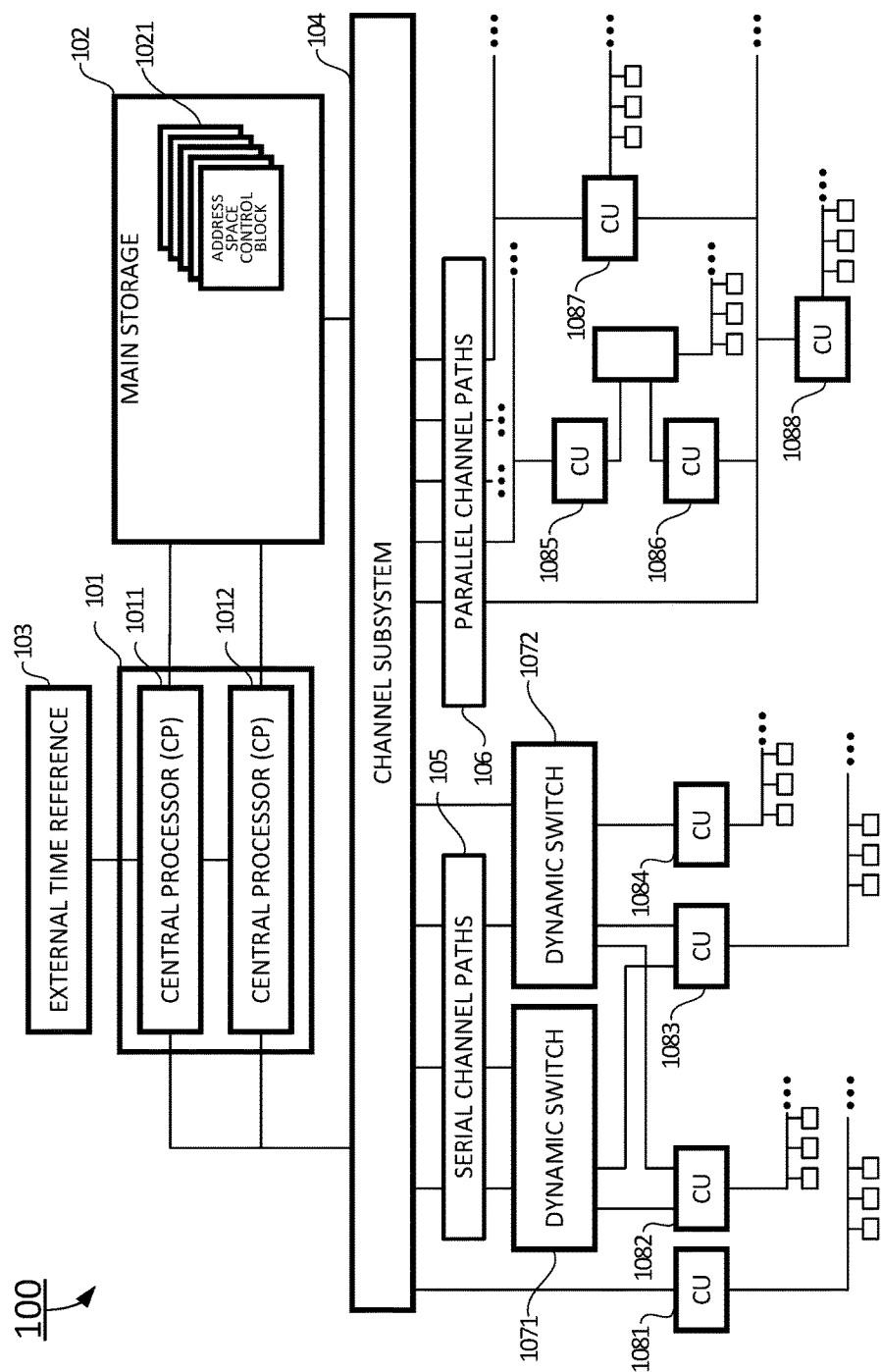
FIG. 1 is a block diagram of a mainframe computer for implementing the teachings herein according to certain embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that the same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

"Java" is a general-purpose computer programming language that is concurrent, class-based, object-oriented, and specifically designed to have as few implementation dependencies as possible. Java is a trademark of Oracle Corporation.

"JVM" stands for Java virtual machine.
"ASCB" stands for address space control block.
"LPAR" stands for logical partition.
"CICS" stands for customer information control system;
"DB2" stands for a relational database management system; and
"IMS" stands for information management system.

As used herein, "plurality" means two or more. The terms "comprising," "including," "carrying," "having," "containing," "involving," and the like are to be understood to be open-ended, i.e., to mean including but not limited to.

The present disclosure will now be described more fully hereinafter with reference to the accompanying drawings FIGS. 1-4, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, a block diagram of a mainframe computer 100 that implements the teachings herein is shown according to certain embodiments of the present invention. The mainframe computer 100 may include a central processor (CP) 101, a main storage 102, an external time reference 103, a channel subsystem 104, a serial channel path 105, and a parallel channel path 106. In one embodiment, the mainframe computer 100 may include one or more application processors, such as 1011 and 1012, as shown in FIG. 1. Each of the CP 1011 and CP 1012 may be a single core processor, or a multi-core processor and they are the main processing power of the mainframe computer 100.

In certain embodiments, the main storage 102 may include non-volatile read only memory (ROM), and volatile random access memory (RAM). The non-volatile read-only memory may be used to store computer programs, operating systems and persistent data. The volatile RAM may be used to load and execute computer executable instructions, and store live data such as performance metrics data. In one embodiment, the main storage 102 may include process control blocks 1021. The process control blocks 1021 may include at least one address space control block for each address space on the mainframe computer 100. The address space control block may include information necessary to discover, to manage, and to monitor the Java virtual machine. In certain embodiments, the main storage 102 may include a common collector, or a collector. The collector is a data space in system memory cache to collect data. The collector is a process on the mainframe computer 100, only one collector is needed for each logical partition (LPAR). The collector will hold management information for all of the Java virtual machines running on the LPAR.

The external time reference (ETR) 103 may be connected to the mainframe computer 100 to guarantee time synchronization among distinct computer systems. One or more ETR cards provide interfaces to system timers, which are used for timing synchronization among computer systems.

The channel subsystem 104 is physically, exactly the same as a central processor (CP), but with a different microcode. The channel subsystem 104 acts as an offload engine for the CPs. Different server models have different number of channel subsystems. The channel subsystems relieves CP involvement, thus guaranteeing one available channel path to execute the input/output (I/O) operation, but it is not in charge of the movement between the central storage (CS) and the channel.

A channel assists in dialogs with an I/O control unit (CU), to execute an I/O operation, i.e., data transfer from or to memory and devices. With multiprogramming and multi-processing becoming more and more popular, using a channel to assist CP for I/O operation makes CP and I/O operations more efficient. A channel path employs either a parallel-transmission electric protocol or a serial-transmission light protocol, and accordingly, is called either a parallel channel path (106) or a serial channel path (105). For better connectivity and flexibility, a serial channel may connect to a control unit (CU, 1081, 1082, 1083, and 1084 as shown in FIG. 1) through one or more dynamic switches (1071 and 1072, as shown in FIG. 1). The dynamic switches 1071 and 1072 are capable of providing multiple connections between entities connected to ports of the dynamic switches, or between the channels and I/O control units (CUs).

Figure 2:
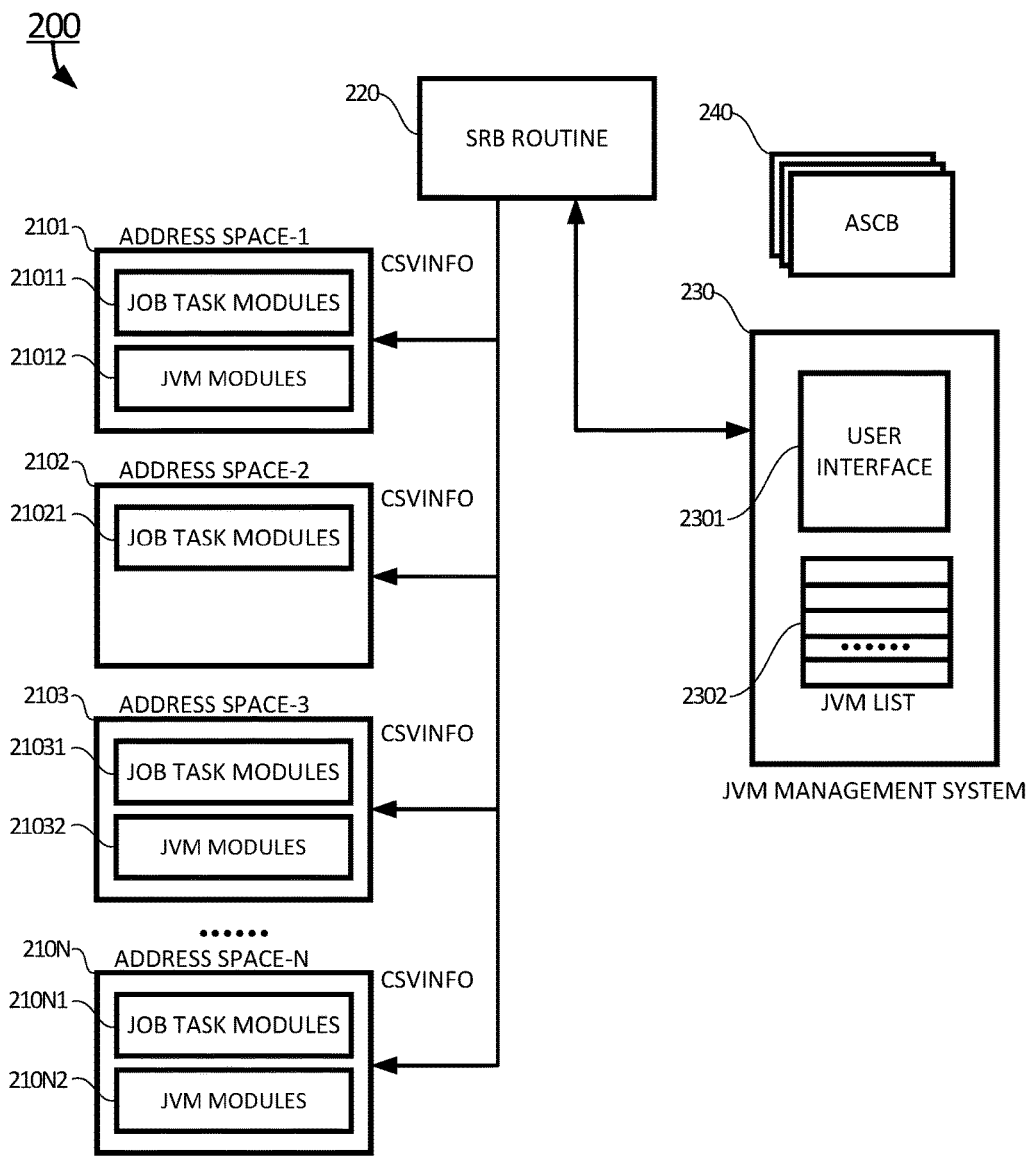
FIG. 2 is a block diagram of a computing system capable of discovering and classifying Java virtual machines running on a logical partition of the computing system according to certain embodiments of the present invention.

Referring now to FIG. 2, a block diagram of a system 200 for discovering and classifying one or more Java virtual machines (JVM) running on a logical partition of a computing system is shown according to certain embodiments of the present invention. In certain embodiments, the system 200 may include one or more address spaces 2101, 2102 . . . and 210N, where N is a positive integer, and a JVM management system 230. The address spaces 2101, 2102, 2103, . . . and 210N may have one or more job task modules 21011, 21021, 21031, . . . and 210N1, respectively. In certain embodiments, some of the address spaces may include one or more JVM modules 21012, 21032, . . . and 210N2, and some of the address spaces, for example 2102 does not include any JVM modules. Those address spaces including one or more JVM modules are JVM eligible address spaces. JVM can only start on the JVM eligible address spaces, such as 21012, 21032, . . . and 210N2. In certain embodiments, the JVM management system 230 may include a user interface 2301. Operating system control blocks may include one or more address space control block (ASCB)s 240, these ASCBs may be a portion of the address space control blocks 1021 of the mainframe computer 100 that stores live data related to each address space running on the logical partition of the mainframe computer 100. In one embodiment, the one or more ASCBs 240 may include volatile memory such as RAM.

A user at a user interface 2301 of the JVM management system 230 may initiate a request which causes the JVM Management System 230 to schedule a Service Request Block (SRB) routine 220 into every address spaces in the system that is eligible to run Java by being dubbed into UNIX System Services (USS) indicated by flags in a corresponding address space control block (ASCB). The SRB routine executes in the context of the address space to which it is dispatched and uses a CSVINFO operating system service to call a Content Supervisor for the address space which returns a list of all modules loaded in the address space. The information returned includes the module names and paths for USS modules of the subsystem and application programs running in the address space. If modules used for running JVMs are found, (such as libjvm.so), this indicates that the address space is hosting a JVM. Subsystem-reserved module names returned by the CSVINFO call can be used to classify the subsystem and application that the address space is running. Certain naming conventions maybe used for different modules for different subsystems. For example, if a module name of DFHSIP is loaded, this indicate a Customer Information Control (CICS) subsystem. Similarly, if a USS module libbboglog.so is loaded in the address space, this is a module used only in a WebSphere Application Server environment and the subsystem can be classified as a WebSphere. Other subsystems may use modules with corresponding signature naming conventions to classify an address space. Java information may include a file system directory location of the Java runtime (Java_Home). By convention, the Java home directory contains a file (version.properties) containing a Java version, a build level, a service release, a Garbage Collector (GC) level, a Just-in time (JIT) Compiler and other serviceability information. The contents of the file are read by the JVM management system 230 and displayed on the user interface 2301 of the JVM management system 230 along with subsystem identification information. Such information is crucial for the operation of the JVM on the computing system and allows system administrators, operators and support staffs to quickly identify workloads that are running Java, to direct the appropriate management resources, or to identify workloads that may be running vulnerable versions of Java.

One of the novel aspects of the present disclosure is to use non-conventional data transmission method instead of conventional network approach. The information related to the JVMs running on the computing system is retrieved using a low-level Service Request Block (SRB) which is independent from other system services like network service. Even when the network service is down, the transmission of the information related to the JVMs will not be disrupted.

When the JVM management system 230 is started, a Service Request Block (SRB) routine 220 is constructed in common storage together with a parameter list. Each ASCB may be examined for eligibility to run a JVM, by examining flags that indicate the address space is dubbed into UNIX System Services, and that the address space is dispatchable. If so, the SRB routine 220 may be scheduled synchronously using an IEAMSCHD service to the address space. The SRB routine 220 may run in the context of the scheduled address spaces 2101 through 210N. A CSVINFO macro may be used to query a corresponding content supervisor for the address space which returns a list of all loaded modules to the caller. Each module may be examined to look for a signature JVM module, libjvm.so. When such a module is found, the SRB routine 220 may return the path name to the libjvm.so module. The SRB routine 220 may also search for modules with signature module names that classify subsystems, such as DFHSIP for CICS; DSNX9WLM for DB2. If the SRB routine has found a JVM, the version.properties file in the JVM path is opened, and the contents read. The properties contain a JVM version, a release and service level, a GC version, a JIT version and other information valuable to system programmers and JVM subject matter experts. The JVM and host subsystem information is displayed to end users at the user interface 2301 of the JVM management system 230.

Only one JVM management system 230 is needed for each logical partition (LPAR).

In certain embodiments, the JVM management system 230 monitors and manages the JVMs running on the mainframe computer 100 automatically. In other embodiments, one or more system administrators and operators may use the user interface (UI) 2301 to manually monitor and manage the JVMs running on the mainframe computer 100.

In certain embodiments, the CSVINFO macro may be used. The CSVINFO macro provides the information related to the modules loaded in the address spaces. If a signature module used only by JVMs is found, such as libjvm.so, this indicates that the address space is running a JVM.

In certain embodiments, the information related to the JVM provided by the CSVINFO macro may be used to locate an identification file indicating the JVM is running on the logical partition. The identification file may include a version of the JVM, a service release of the JVM, fix pack levels of the JVM, and other JVM components. The data provided by CSVINFO may identify the subsystem types, such as customer information control system (CICS), information management system (IMS) or relational database management system DB2. Such information is crucial for the operation of the JVM on the computing system and allows system administrators, operators and support staffs to quickly identify workloads that are running Java, to direct the appropriate management resources, or to identify workloads that may be running vulnerable versions of Java.

Figure 3:
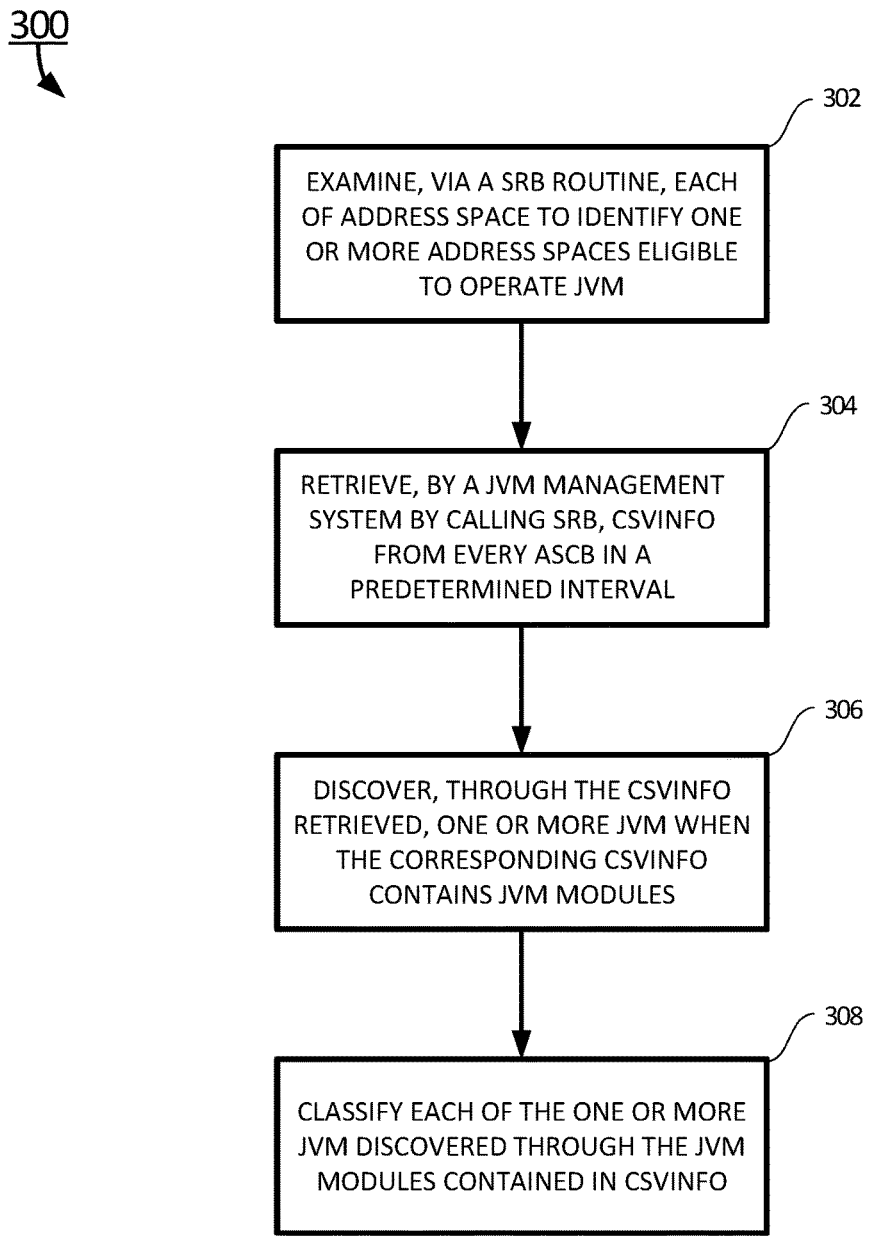
FIG. 3 is a flow chart of a method of discovering and classifying Java virtual machines running on the logical partition of the computing system according to certain embodiments of the present invention.

Referring now to FIG. 3, a flow chart of a method 300 for automatic discovery of Java virtual machines (JVM) running on a logical partition of a computing system is shown according to certain embodiments of the present invention.

At block 302, after startup of the JVM management system 230, a Service Request Block (SRB) routine 220 is constructed in common storage along with a parameter list. An Address Space Vector Table (ASVT) is iterated and each address space control block (ASCB) and address space secondary block (ASSB) is examined for flags that indicate the address space is capable of running a JVM (dispatchable and dubbed into UNIX System Services). Each address space is examined to identify one or more address spaces eligible to operate JVM.

At block 304, retrieve, by the JVM management system by calling the SRB, CSVINFO from each ASCB. In one embodiment, the JVM management system retrieves the CSVINFO automatically in a predetermined interval. In another embodiment, a user at the user interface of the JVM management system may retrieve the CSVINFO manually to certain eligible address spaces. In certain embodiments, for each address space for which the SRB is scheduled, Content Directory Entries (CDE) blocks are returned by a Content Supervisor based on CSVINFO that is retrieved using the CSVINFO macro call. As noted above, the CSVINFO macro call returns a list of all modules loaded into the address space.

At block 306, certain signature module names are sought to determine whether a JVM is loaded in the address space. If so, a JVM is discovered, and the path name of the JVM module is returned to the JVM management system. The SRB routine also searches for signature module names that indicate what kind of application subsystem the JVM is running in. The information is returned to the JVM management system. At block 308, the data returned by the SRB routine is further examined. If a JVM has been identified, the JVM identified may be classified by examining module path, opening a version.properties file, and reading a version related data. The classified JVM may be added to a JVM list 2302 of the JVM management system 230, and displayed on the user interface 2301 of the JVM management system 230, together with the subsystem classification information.

In certain embodiments, the CSVINFO may include an identification file indicating the Java virtual machine is running on the logical partition. The identification file may include a version of the JVM, a service release of the JVM, fix pack levels of the JVM, and signature load modules of the JVM. The Java data may include: one or more jobs, one or more started tasks, and one or more started subsystems running on the JVM. The data may identify the subsystem types, such as customer information control system (CICS), information management system (IMS) or relational database management system DB2, through the specific started tasks or started jobs, a version of Java that is being used, and a file system directory location of the Java runtime (JAVA_HOME). Such information is crucial for the operation of the JVM on the computing system and allows system administrators, operators and support staffs to quickly identify workloads that are running Java, to direct the appropriate management resources, or to identify workloads that may be running vulnerable versions of Java.

Figure 4:
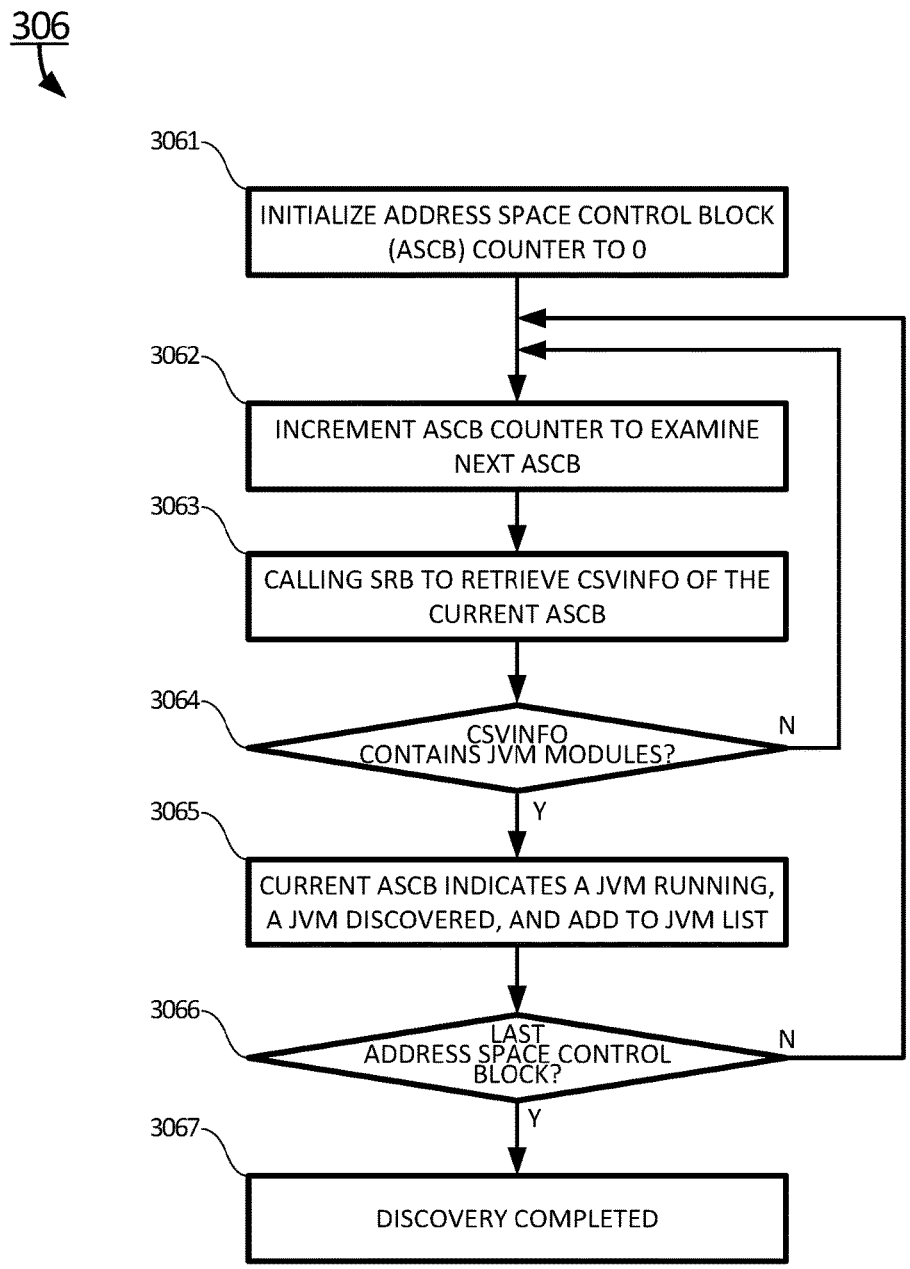
FIG. 4 is a detailed flow chart of discovering and classifying Java virtual machines running on the logical partition of the computing system according to certain embodiments of the present invention.

Referring now to FIG. 4, a detailed flow chart 306 of discovering and classifying Java virtual machines running on the mainframe computer 100 is shown according to certain embodiments of the present invention. As described above in FIG. 3, this discovery process 306 may be performed in the predetermined interval periodically. In every discovery cycle, each and every one of the one or more address space control blocks is examined by the JVM management system 230.

At block 3061, an address space control block (ASCB) counter is initialized to zero for starting a new discovery cycle.

At block 3062, the ASCB counter is incremented to a first ASCB (or current ASCB) for examination by the JVM management system 220.

At block 3063, the JVM management system 220 may determine from the current ASCB whether the corresponding address space is eligible to operate JVM, whether the corresponding address space is dubbed into UNIX System Services and is dispatchable. If so, the JVM management system 220 may schedule a service request block (SRB) to the address space to retrieve the CSVINFO for the current ASCB.

At query block 3064, the SRB code examines the content supervisor control blocks in the current ASCB and searches for UNIX shared library module names that implement the JVM runtime. If a signature module is found, this indicates that the current ASCB corresponds a running JVM. The SRB code also examines the content supervisor control blocks for signature modules that identifies a specific subsystem type, such as CICS, IMS or DB2.

When the current ASCB uses the UNIX system services, a JVM running on the mainframe computer 100 is discovered, then the method 306 continues to block 3065. Otherwise, the current ASCB does not correspond to a running JVM, and the method 306 goes back to 3062 to examine the next ASCB.

At block 3065, the JVM management system 220 discovered a JVM and this JVM and its information related to the JVM discovered is stored in the JVM list 2302 of the JVM management system 230. In certain embodiments, the JVM discovered is displayed on the user interface 2301 of the JVM management system 230.

At query block 3066, the JVM management system 220 may check whether the current ASCB is the last ASCB to be examined.

When the current ASCB is the last ASCB to be examined, then the method 306 continues to block 3067 to conclude this discovery cycle. Otherwise, there are other ASCB to be examined, and the method 306 goes back to 3062 to examine the next ASCB.

At block 3067, the discovery cycle comes to an end.

In another embodiment of the present invention, a computing system for automatic discovery of Java virtual machines (JVM) running on a logical partition of a computing system may include a memory storing computer executable instructions for the computing system, and a processor for executing the computer executable instructions. When the computer executable instructions are executed at the processor, the computer executable instructions cause the computing system to perform: examining, via a service request block (SRB) routine, each of address spaces to identify one or more address spaces eligible to operate a Java virtual machine (JVM), retrieve, by a JVM management system via a CSVINFO macro call to each of address space control blocks (ASCB) on the logical partition (LPAR) of the computing system, in a predetermined interval, each of the of ASCBs corresponds to one of the address spaces, discovering, through CSVINFO retrieved, one or more JVMs running on the LPAR of the computing system, and classifying, through Content Directory Entries examined using the CSVINFO macro, the one or more JVMs discovered.

In yet another embodiment of the present invention, a computer program product for automatic discovery of Java virtual machines running on a logical partition of a computing system may include a non-transitory computer readable storage medium having computer executable instructions embodied therewith, when executed by a processor on a computing system, the computer executable instructions cause the processor to perform: examining, via a service request block (SRB) routine, each of address spaces to identify one or more address spaces eligible to operate a Java virtual machine (JVM), retrieve, by a JVM management system via a CSVINFO macro call to each of address space control blocks (ASCB) on the logical partition (LPAR) of the computing system, in a predetermined interval, each of the ASCBs corresponds to one of the address spaces, discovering, through CSVINFO retrieved, one or more JVMs running on the LPAR of the computing system, and classifying, through Content Directory Entries examined using the CSVINFO macro, the one or more JVMs discovered.

The present invention may be a computing system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatic discovery and classification of Java virtual machines on a logical partition (LPAR) of a computing system, the computing system comprising a main storage memory comprising at least volatile memory, wherein the volatile memory includes a common collector and a plurality of address space control blocks (ASCB), the plurality of ASCBs comprising at least one ASCB for each address space of a plurality of address spaces of the LPAR, wherein the common collector comprises a data space in system memory, the method comprising:

constructing a Service Request Block (SRB) routine in the common collector along with a parameter list, wherein the SRB routine is independent from at least one system service, wherein the at least one system service includes a network service;

examining, via the SRB routine, each ASCB of the plurality of ASCBs to identify one or more address spaces of the plurality of address spaces of the LPAR that are eligible to operate a Java virtual machine (JVM), wherein examining each ASCB includes examining each ASCB for flags that indicate that a corresponding address space is dubbed into UNIX System Services (USS) and that the corresponding address space of the ASCB is dispatchable;

retrieving CSVINFO, by a JVM management system via a CSVINFO macro call to each of the plurality of ASCBs on the LPAR of the computing system, in a predetermined interval;

automatically discovering, through the CSVINFO retrieved, one or more JVMs running on the LPAR of the computing system; and automatically classifying, through a plurality of Content Directory Entries examined using the CSVINFO macro call, the one or more JVMs discovered;

wherein the retrieving and the discovering comprises:
for each ASCB of the plurality of ASCBs:
calling the SRB routine to retrieve CSVINFO from the ASCB, wherein the CSVINFO from the ASCB includes a list of modules loaded on the ASCB; and
discovering a JVM when the CSVINFO from the ASCB includes one or more JVM modules by at least detecting by the SRB routine, whether a JVM module named libjvm.so is present in the list of modules, wherein the SRB routine is configured to return a path name to the libjvm.so module in response to detecting that the libjvm.so module is present.

2. The method of claim 1, wherein the discovering further comprises:
for each of the plurality of ASCBs:
exploring a next ASCB when the ASCB does not include any JVM module;
checking whether each of the plurality of ASCBs has been explored; and
completing the discovering when each of the plurality of ASCBs has been explored, and going to a next ASCB when one or more of the plurality of ASCBs have not been explored.

3. The method of claim 1, wherein each address space comprises one or more job task modules.

4. The method of claim 1, wherein when an address space includes one or more JVM modules, the address space is eligible to operate a JVM.

5. The method of claim 4, wherein when a JVM is running on the computing system, the JVM is classified by identifying, based on the CSVINFO retrieved, a subsystem type for each of the one or more JVM modules contained in the corresponding address space, wherein the subsystem types identified include at least one of a customer information control system (CICS), information management system (IMS) or relational database management system (DB2).

6. The method of claim 5, wherein the SRB routine dispatched to each eligible address space invokes the CSVINFO macro through a content supervisor application program interface (API) to retrieve corresponding CSVINFO of the address space.

7. The method of claim 1, wherein the CSVINFO comprises:
an identification file indicating the JVM is running on the logical partition, wherein the identification file comprises:
a path to an installation location of the JVM and the JVM runtime programs;
a version of the JVM;
a service release of the JVM;
fix pack levels of the JVM; and
signature load modules of the JVM.

8. A computing system for automatic discovery and classification of a plurality of Java virtual machines running on a logical partition (LPAR) of a computing system, comprising a memory storing computer executable instructions for the computing system, and a processor for executing the computer executable instructions, the computing system further comprising a main storage memory comprising at least volatile memory, wherein the volatile memory includes a common collector and a plurality of address space control blocks (ASCB), the plurality of ASCBs comprising at least one ASCB for each address space of a plurality of address spaces of the LPAR, wherein the common collector comprises a data space in system memory, the computer executable instructions comprising:

constructing a Service Request Block (SRB) routine in the common collector along with a parameter list, wherein the SRB routine is independent from at least one system service, wherein the at least one system service includes a network service;

examining, via the SRB routine, each ASCB of the plurality of ASCBs to identify one or more address spaces of the plurality of address spaces of the LPAR that are eligible to operate a Java virtual machine (JVM), wherein examining each ASCB includes examining each ASCB for flags that indicate that a corresponding address space is dubbed into UNIX System Services (USS) and that the corresponding address space of the ASCB is dispatchable;

retrieving CSVINFO, by a JVM management system via a CSVINFO macro call to each of the plurality of ASCBs on the LPAR of the computing system, in a predetermined interval;

automatically discovering, through the CSVINFO retrieved, one or more JVMs running on the LPAR of the computing system; and automatically classifying, through a plurality of Content Directory Entries examined using the CSVINFO macro call, the one or more JVMs discovered;

wherein the retrieving and the discovering comprises:
for each ASCB of the plurality of ASCBs:
calling the SRB routine to retrieve CSVINFO from the ASCB, wherein the CSVINFO from the ASCB includes a list of modules loaded on the ASCB; and
discovering a JVM when the CSVINFO from the ASCB includes one or more JVM modules by at least detecting by the SRB routine, whether a JVM module named libjvm.so is present in the list of modules, wherein the SRB routine is configured to return a path name to the libjvm.so module in response to detecting that the libjvm.so module is present.

9. The computing system of claim 8, wherein the discovering further comprises:
for each of the plurality of ASCBs:
exploring a next ASCB when the ASCB does not include any JVM module;
checking whether each of the plurality of ASCBs has been explored; and
completing the discovering when each of the plurality of ASCBs has been explored, and going to a next ASCB when one or more of the plurality of ASCBs have not been explored.

10. The computing system of claim 8, wherein each address space comprises one or more job task modules.

11. The computing system of claim 8, wherein when an address space includes one or more JVM modules, the address space is eligible to operate a JVM.

12. The computing system of claim 11, wherein when a JVM is running on the computing system, the JVM is classified by identifying, based on the CSVINFO retrieved, a subsystem type for each of the one or more JVM modules contained in the corresponding address space, wherein the subsystem types identified include at least one of a customer information control system (CICS), information management system (IMS) or relational database management system (DB2).

13. The computing system of claim 12, wherein the SRB routine dispatched to each eligible address space invokes the CSVINFO macro through a content supervisor application program interface (API) to retrieve corresponding CSVINFO of the address space.

14. The computing system of claim 8, wherein the CSVINFO comprises:
an identification file indicating the JVM is running on the logical partition, wherein the identification file comprises:
a path to an installation location of the JVM and the JVM runtime programs;
a version of the JVM;
a service release of the JVM;
fix pack levels of the JVM; and
signature load modules of the JVM.

15. A computer program product for automatic discovery and classification of a plurality of Java virtual machines running on a logical partition (LPAR) of a computing system, comprising a non-transitory computer readable storage medium having computer executable instructions embodied therewith that when executed by a processor on the computing system, cause the processor to perform a method, the computing system further comprising a main storage memory comprising at least volatile memory, wherein the volatile memory includes a common collector and a plurality of address space control blocks (ASCB), the plurality of ASCBs comprising at least one ASCB for each address space of a plurality of address spaces of the LPAR, wherein the common collector comprises a data space in system memory, wherein the method includes:

constructing a Service Request Block (SRB) routine in the common collector along with a parameter list, wherein the SRB routine is independent from at least one system service, wherein the at least one system service includes a network service;

examining, via the SRB routine, each ASCB of the plurality of ASCBs to identify one or more address spaces of the plurality of address spaces of the LPAR that are eligible to operate a Java virtual machine (JVM), wherein examining each ASCB includes examining each ASCB for flags that indicate that a corresponding address space is dubbed into UNIX System Services (USS) and that the corresponding address space of the ASCB is dispatchable;

retrieving CSVINFO, by a JVM management system via a CSVINFO macro call to each of the plurality of ASCBs on the LPAR of the computing system, in a predetermined interval;

automatically discovering, through the CSVINFO retrieved, one or more JVMs running on the LPAR of the computing system; and automatically classifying, through a plurality of Content Directory Entries examined using the CSVINFO macro call, the one or more JVMs discovered;

wherein the retrieving and discovering comprises:
for each ASCB of the plurality of ASCBs:
calling the SRB routine to retrieve CSVINFO from the ASCB, wherein the CSVINFO from the ASCB includes a list of modules loaded on the ASCB; and
discovering a JVM when the CSVINFO from the ASCB includes one or more JVM modules by at least detecting by the SRB routine, whether a JVM module named libjvm.so is present in the list of modules, wherein the SRB routine is configured to return a path name to the libjvm.so module in response to detecting that the libjvm.so module is present.

16. The computer program product of claim 15, wherein the discovering further comprises:
for each of the plurality of ASCBs:
exploring a next ASCB when the ASCB does not include any JVM module;
checking whether each of the plurality of ASCBs has been explored; and
completing the discovering when each of the plurality of ASCBs has been explored, and going to a next ASCB when one or more of the plurality of ASCBs have not been explored.

17. The computer program product of claim 15, wherein each address space comprises one or more job task modules, and wherein when an address space includes one or more JVM modules, the address space is eligible to operate a JVM.

18. The computer program product of claim 17, wherein when a JVM is running on the computing system, the JVM is classified by identifying, based on the CSVINFO retrieved, a subsystem type for each of the one or more JVM modules contained in the corresponding address space, wherein the subsystem types identified include at least one of a customer information control system (CICS), information management system (IMS) or relational database management system (DB2).

19. The computer program product of claim 18, wherein the SRB routine dispatched to each eligible address space invokes the CSVINFO macro through a content supervisor application program interface (API) to retrieve corresponding CSVINFO of the address space.

20. The computer program product of claim 15, wherein the CSVINFO comprises:
   an identification file indicating the JVM is running on the logical partition, wherein the identification file comprises:
      a path to an installation location of the JVM and the JVM runtime programs;
      a version of the JVM;
      a service release of the JVM;
      fix pack levels of the JVM; and
      signature load modules of the JVM.

* * * * *